United States Patent [19]
Kermani et al.

[11] Patent Number: 5,661,727
[45] Date of Patent: Aug. 26, 1997

[54] SCHEMES TO DETERMINE PRESENCE OF HIDDEN TERMINALS IN WIRELESS NETWORKS ENVIRONMENT AND TO SWITCH BETWEEN THEM

[75] Inventors: Parviz Kermani, South Salem, N.Y.;
Danny N. McKay, Toronto, Canada;
Mahmoud Naghshineh, Fishkill, N.Y.;
Frank Peter Novak, Park Ridge, N.J.;
Babak Rezvani, Portchester, N.Y.

[73] Assignee: International Business Machines Corporation, Armonk, N.Y.

[21] Appl. No.: 662,840

[22] Filed: Jun. 12, 1996

[51] Int. Cl.$^6$ .................................. H04L 12/413
[52] U.S. Cl. ................................................ 370/445
[58] Field of Search ..................... 370/85.3, 95.1, 370/95.3, 85.2, 85.7, 85.13, 445, 446, 447, 448, 310, 329, 330

[56] References Cited

U.S. PATENT DOCUMENTS

| 4,665,519 | 5/1987 | Kirchner et al. ................ 370/60 |
| 5,077,732 | 12/1991 | Fischer et al. ................ 370/85.6 |
| 5,231,634 | 7/1993 | Giles et al. ................ 370/95.1 |
| 5,321,542 | 6/1994 | Freitas et al. ................ 359/127 |
| 5,369,639 | 11/1994 | Kamerman et al. ................ 370/85.3 |
| 5,379,290 | 1/1995 | Kleijne ................ 370/85.2 |
| 5,422,887 | 6/1995 | Diepstraten et al. ................ 370/85.3 |
| 5,502,724 | 3/1996 | Chen et al. ................ 370/85.3 |
| 5,515,035 | 5/1996 | Gut ................ 370/85.3 |

FOREIGN PATENT DOCUMENTS

| 0653865 | 5/1995 | European Pat. Off. . |
| 9501020 | 1/1994 | WIPO . |

OTHER PUBLICATIONS

IBM Technical Disclosure Bulletin, vol. 37, No. 10, Oct. 1994, pp. 299–301.

Primary Examiner—Douglas W. Olms
Assistant Examiner—Ajit Patel
Attorney, Agent, or Firm—Douglas W. Cameron; Anne Vachon Dougherty

[57] ABSTRACT

A method of delievering data in a wireless communications network using a combination of collision sensing and collision avoiidance protocols. More precisely, if there are no hidden nodes detected in the network, a collision sensing protocol is used; however, if there are hidden nodes, then a collision avoidance protocol is used. This invention also deals with methods of determining the presence or absence of hidden nodes.

8 Claims, 8 Drawing Sheets

ALGORITHM I HARDWARE IMPLEMENTATION

| NODE | STATUS | DEPENDENCY | COUNT |
|---|---|---|---|
| 1 | B | {2} | 0 |
| 3 | 1 |  | 10 |
| 4 | B | {5,7} | 25 |
| : | : | : | : |

ALGORITHM IMPLEMENTATION FOR THE DEPENDENCY LIST

SCHEMES TO DETERMINE PRESENCE OF HIDDEN TERMINALS IN WIRELESS NETWORKS ENVIRONMENT AND TO SWITCH BETWEEN THEM

BACKGROUND OF INVENTION

1. Field of the Invention

The present invention relates to methods for transferring data between a source and a number of receiving data processing devices. More precisely, the present invention relates to the methods used in data transfer in a local area network (LAN) between a number of data processing devices, where the devices use a wireless link media (such as radio signals or infrared signals) for delivering data.

2. Background

CSMA (carrier sense multiple access) is a powerful class of access schemes in wireless local area networks (LANs). The advantage of CSMA is its high throughput, simplicity of operation, and relatively ease of hardware implementation. When the number of stations is not too large and there is no obstacle on the path of (wireless) signals, all stations can hear each other. In this case the performance of the system can reach the theoretical limit which is approximately 98% [TOBAJI80]. Unfortunately, in practice that, is not always the case and stations most often cannot hear each other directly, which results in a mode of operation commonly referred to as the hidden terminal case. In such a case, there is a higher chance of collision between stations. The throughput is degraded substantially. In the limit, when all terminals become hidden from each other (and hence have the potential of colliding with others) the operation become similar to the pure ALOHA [ABBRAMSON70] and the throughput limit becomes only 18%.

An environment in which there is a high chance of presence of hidden terminals is the case in which the communication media is diffused infrared (IR). IR signals do not penetrate through solid objects, and signals are reflected and bounced back on solid objects and that is in fact how they reach stations and fill an environment.

When there are hidden terminals, one can use number of solutions to overcome the degradation in throughput efficiency. One is the use of a busy tone signal. In this case, a separate band is allocated for the busy tone signal. When a station is transmitting data, it sends the busy tone on the dedicated channel. Each terminal which hears a busy signal, sends a busy signal of its own. In this case the busy signal occupies the entire environment and potentially can be heard by all terminals. This technique, while effective, cannot be used in all environments. The busy signal channel must be carved out of the total bandwidth. In addition, terminals must be equipped with rather accurate filters to separate the busy signal channel from the data channel. The circuitry to do this is rather complex which is translated in a higher production cost.

Another approach is the use of a class of protocols, collectively knows as reservation protocols (or Collision Avoidance protocols, CA). In. this case, a station, before sending its data, reserves the channel so that no other terminal can use it. After transmitting its data, the station releases the channel for others to use. There is always a possibility that the reservation signals of different terminals collide. One solution is to broadcast the reservation signals using a CSMA like protocol. This class of protocols collectively is called CSMA/CA. The winner of the reservation becomes the sole user of the channel to transmit its data.

One such reservation protocol is the RTS/CTS protocol [Bharghavan94] (Request To Send/Clear To Send. The protocol operates as follows When a station has data to send, it first senses the channel (as in the CSMA protocol). If it does not detect any activity and it is not aware of a current transmission (due to a previous RTS), it send an RTS to its destination.

The receiver, when it detects an RTS destined to it, and if it can receive the data, broadcasts a CTS with the sending station address recorded in it.

All other stations (which are passively listening on the channel), when they detect an ongoing RTS, keep quiet (and refrain from transmitting data) till they hear an end of transmission.

The sending station, once it receives a CTS from its destination, sends its data.

At the end of data transmission, there is a handshake between the sender and the receiver through which they broadcast the end of data transmission.

All other stations having realized the channel is free, can now bid to get hold of the channel, as described before.

RTS/CTS, while a very effective protocol, suffers from low throughput efficiency. While its efficiency is substantially higher than pure ALOHA (18%), it is less than the efficiency of CSMA.

There is therefore a need for an adaptive access protocol.

SUMMARY OF THE INVENTION

This invention describes techniques for determining when there are hidden nodes. More specifically, with this invention, a class I protocol (such as carrier sense multiple access protocol) is used to access a wireless network if there are no hidden nodes. Otherwise, a class II protocol (such as a reservation protocol) is used for accessing the network.

Algorithm I: Distributed Algorithm for Detection of Hidden Nodes

In this algorithm, each node monitors the traffic in the LAN (whether the packets are destined to the node or not) and records the source and destination nodes of the packets in a table. Associated with each entry, there is a status table which indicates whether the node is within range (not hidden) or not. When this node desires to send a packet (to any destination), if there is any node in the table which is hidden, then the node uses a reservation CSMA (R-CSMA) type of media access control (MAC). On the other hand, if all nodes in the table are marked as "in range", then the transmitting node uses the more efficient CSMA scheme. The advantage of this algorithm is its simplicity of implementation. The disadvantage is its 'non-selectiveness'. The next algorithms provide improvements in this aspect.

Algorithm II: Distributed Algorithm for Collection of Nodes with Hidden Features In this algorithm each node, say n, takes an active role in setting up a Topology Table to store information about other nodes in the network (LAN). There is an entry in the table for each other node. Node n maintains some attributes for each entry in the table. The attributes determine if a node in the table is a boundary node or an internal node with respect to node n. A node, say i, is a boundary node to node n if there is a third node which can directly communicate with node i but cannot directly communicate with node n (i.e. this third node is not in range of node n). Otherwise node i is marked to be an internal node. When node n has a copy to send to node i it first checks the status of node i. If i is internal, then node n uses the more efficient pure CSMA like protocols. Otherwise, it uses a reservation CSMA. Compared to Algorithm I, this algorithm operates more efficiently. This comes at the expense of a more complex table maintenance.

Algorithm III: Distributed and Node-Based Algorithm for Detection of Hidden Nodes In this algorithm, each node of the network makes a decision regarding the use of CSMA or CSMA with RTS/CTS (R-CSMA) independently from other nodes. This is done by observing the frames transmitted in the network in a promiscuous way. The complexity of this algorithm is somewhere between Algorithm I and Algorithm II. It has advantages of both systems. Similar to Algorithm I, this algorithm operates non-obtrusively to set up its table. On the other hand, similar to Algorithm II, it decides on the MAC protocol selectively. The more efficient operation comes at the expense of a more complex table which this algorithm maintains.

The invention will now be described in detail with reference to the appended drawings wherein.

DETAILED DESCRIPTION OF THE PREFERRED EMBODIMENTS

Algorithm I: Distributed Algorithm for Detection of Hidden Nodes

Figure 3:
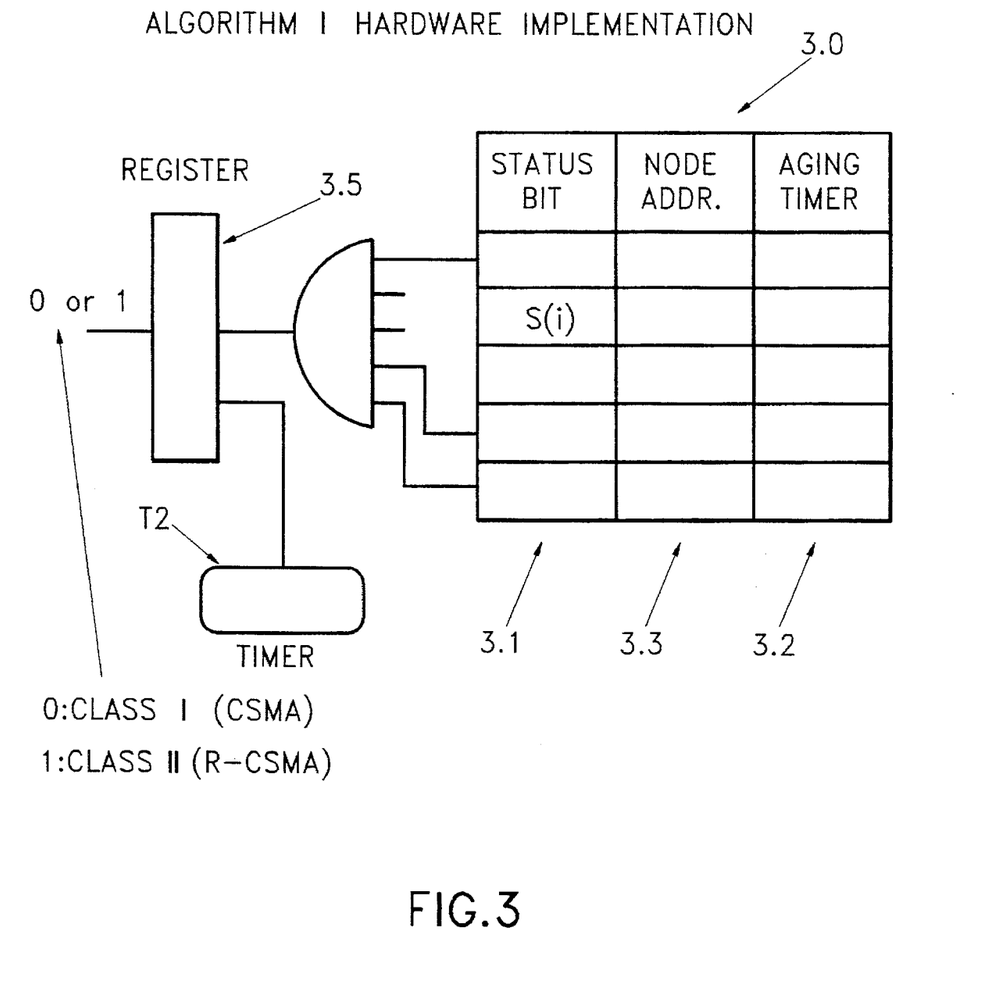
FIG. 3 schematically illustrates a representative hardware implementation for the present invention.

In this section, we describe the algorithm which is used by every node of the network to detect the presence of hidden nodes. In this algorithm, each node of the network makes a decision regarding the use of CSMA or CSMA with RTS/CTS (R-CSMA) independently from other nodes. This is done by observing the frames transmitted in the network in a promiscuous way. The thrust of the algorithm is the following. If a node detects a frame with the source address s and destination address d, then s must be in range of the node and d might be hidden from the node. There are two different decision processes whether the detected node is a data frame (packet) or an acknowledgment frame. Referring to FIG. 3, in order to execute the algorithm, each node maintains a table (3.0) of LAN addresses (3.3) which it knows about ($ID_{13}$ LIST). Each entry of this table has a timer (3.2) associated with it which is used for aging out entries. In addition, each entry i has a status attribute, S(i). S(i) can be either 1 or 0. 1 (or in range) signifies station i to be in range. Similarly, 0 (or out of range), signifies the station to be out of range. Any station uses CSMA or R-CSMA mode. If all entries in the table have status 1 (all are in range), then the station is in CSMA mode. On the other hand, if any station in the table has a 0 status (out of range), then the station is in R-CSMA mode.

It is important to note that this is a distributed algorithm. Each node observes the frame exchanges on the LAN and makes a decision on which mode of the MAC to use. Our assumption in describing this algorithm is that an immediate ACK frame is transmitted by each station after receiving a correct packet from destination to that station and that this is done in the CSMA as well as in the R-CSMA. However, this algorithm can be implemented using the same approach when immediate hardware ACK frames are not used (to do so, the higher level in the protocol stack informs the MAC layer if a packet has arrived correctly. The performance of the protcol with this approach is inferior to the one with hardware ACK).

The algorithm for any node n can be described as follows.

Detection of a Data Frame

Figure 1:
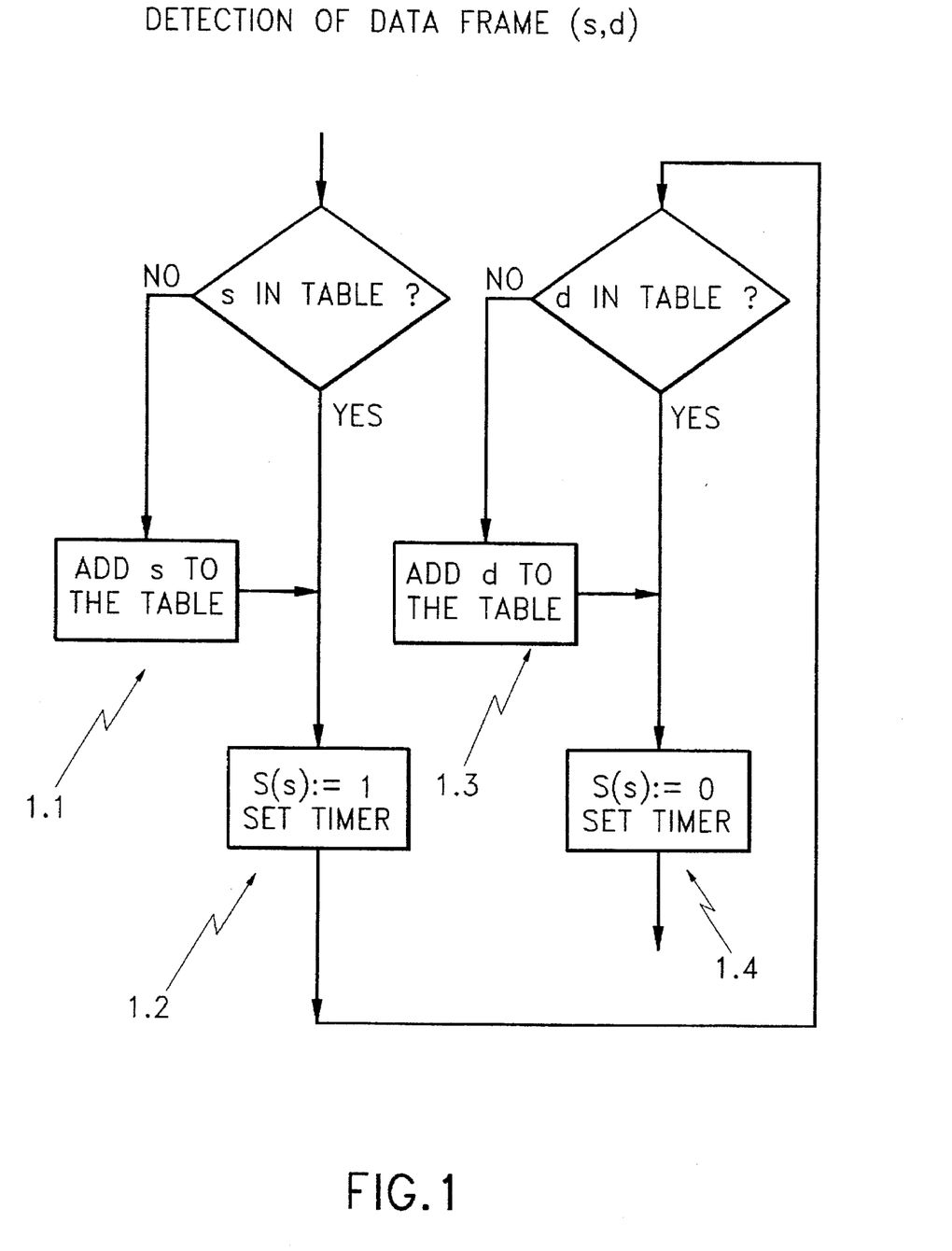
FIG. 1 provides a flow chart for detection of data frames.

Referring to FIG. 1, after detection of a data frame, the source address (s) of the frame, if not already in the table, is added to the table (1.1). In any case, the status of s is marked as 1 (see 1.2). (1 means that the network node is in range of the node n and 0 means potentially out of range). Regarding the destination address (d) of the frame, it is added to the table if it is not already in the table and if it is not a broadcast (or group) address (see 1.3). In any case the status of d is marked as 0 (see 1.4). One final issue is that only packets that are successfully received are used for this algorithm. The reason is that we would like to avoid identifying nodes as hidden if there is no ACK transmitted due to a collision or erroneous transmission.

Detection of an ACK frame

Figure 2:
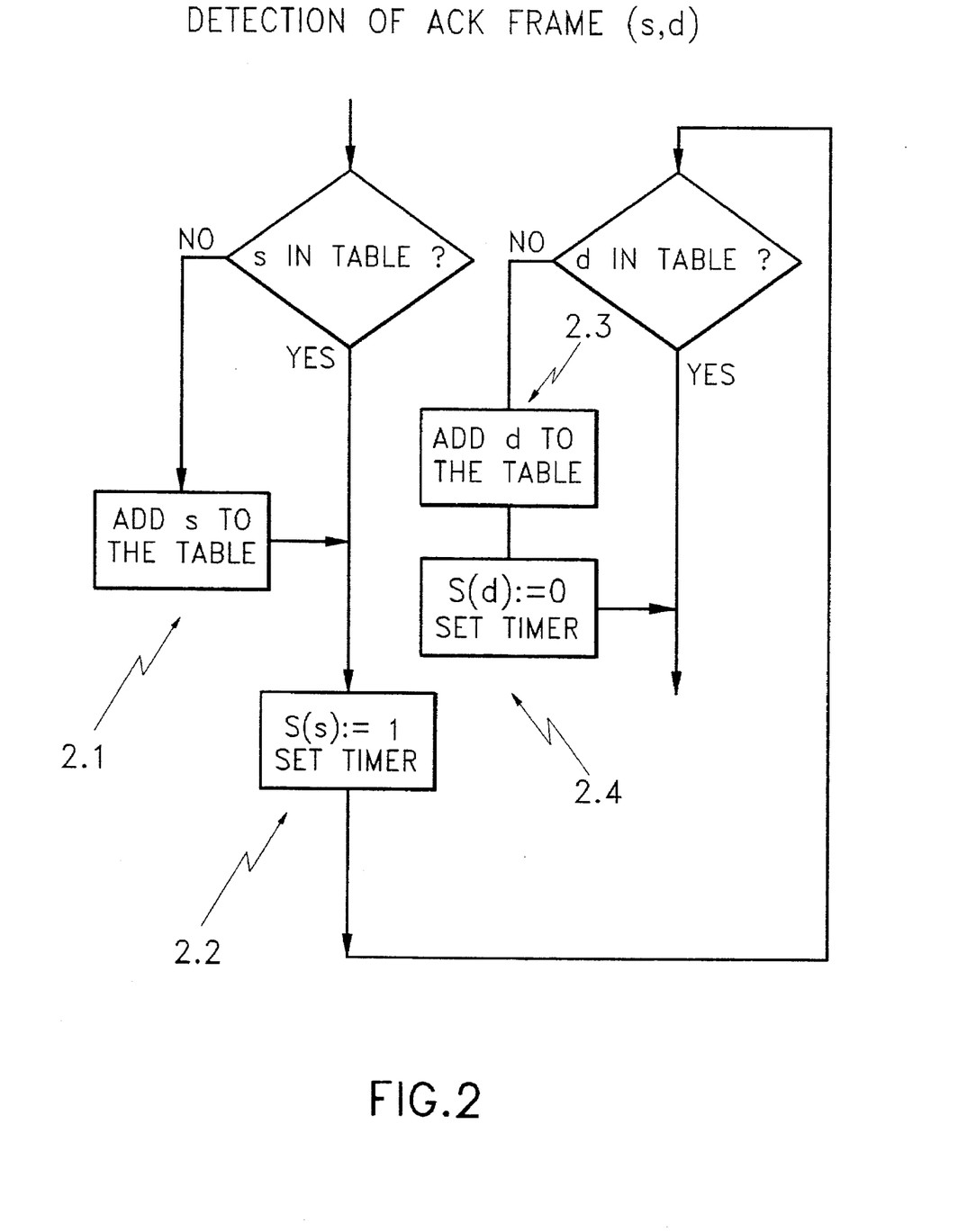
FIG. 2 provides a flow chart for detection of an acknowledgement frame.

Referring to FIG. 2, after detecting an ACK frame, if the source address of the frame is not in the table, it is added (see 2.1). In any case, the status of the source added is set to 1 (see 2.2). In addition, if the destination address of the ACK frame is not in the table, it is added (see 2.3) and its status is marked as 0 (see 2.4).

Aging Timer

As shown in FIG. 3 at 3.2, there is an aging timer associated to each table entry. After each entry which is added to or updated in the table, the associated aging timer is restarted. The aging timer is set to T1. If the aging timer of an entry expires, the entry is removed from the table.

Algorithm Implementation

The algorithm can be implemented in hardware or driver level. The cost of implementing it at the driver level is that the driver software is interrupted at every packet detection destined to any node. Hence, the hardware implementation is preferable. Referring to FIG. 3, the table entries are ANDed (3.4) to get a final mode selection. The output of the AND gate 3.4 and a signal from timer T2 is applied to a register (3.5) to determine the mode to be used. If the final mode is 1, then CMSA is enabled, otherwise R-CSMA is used. The mode selector is used to set the protocol state machine. Finally, the logic has a hysterics timer T2 which is used to avoid rapid switching between the CSMA and R-CSMA. That is, when a mode is selected, the MAC protocol stays in that mode until the T2 has expired.

Algorithm II: Distributed Algorithm for Collection of Nodes with Hidden Features In this approach each node takes an active role to determine the topology of the environment in which it communicates. A node, n, classifies its neighbor nodes to be a Boundary node (B) or an Internal (I). These classifications describe the correlation between node n and its neighbors. Therefore, the detection of each boundary node corresponds to the detection of at least one hidden terminal (node) that n cannot communicate with or hear transmissions from. This relationship is maintained in a table (see 4.0 of FIG. 4), the System Topology Table. If it is determined that there are no hidden nodes which can communicate with a station, then that station is labeled as Internal. A station, I, is internal to another station, J, if J can hear transmission of all I's neighbor (adjacent) nodes. The presence of hidden nodes is detected through boundary nodes. Hence, each boundary node has dependencies (e.g. waiting for ACK) on at least one hidden node. Based on this table all dependencies for each source entry must be eliminated before that station is marked as Internal.

Figure 4:
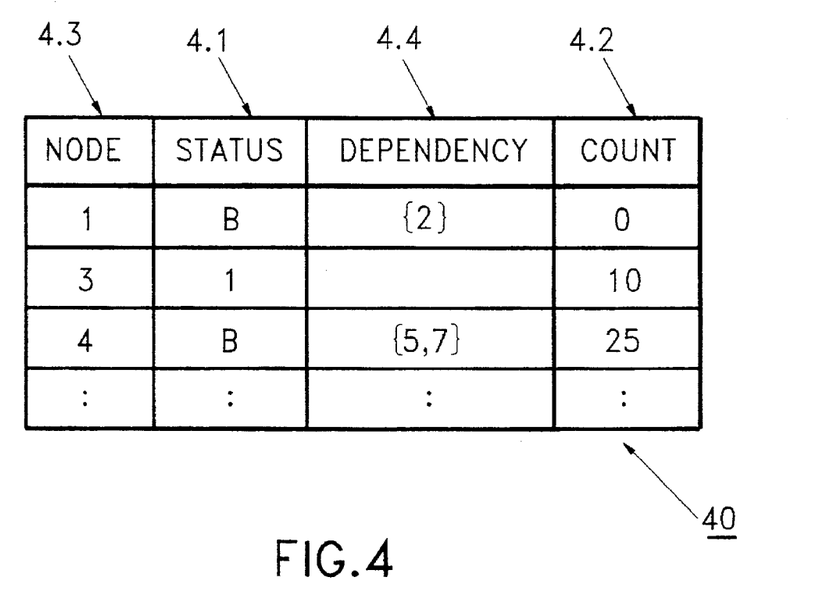
FIG. 4 illustrates a representative system topology table for use in the present invention.

At transmission time each node checks the status (4.1) of the destination in its table and dynamically transmits CSMA with collision avoidance (or Reservation CSMA, R-CSMA) if the status is B, or pure CSMA if the destination is an I node. If the destination is not found in the table, then the node sends the packet using an R-CSMA scheme. The node will switch to pure carrier sensing when the destination is declared as I.

There are also additional table maintenance techniques such as water mark phase out and event based table updates added to ensure entry validation and movement in the environment. Watermark is a node phase out which can be described as a predefined count (4.2). The count is incremented or reset (as described below) based on the table entries and, once reached that node is dropped from the table. This is as a result of a station leaving the environment. Event based updates are implemented to ensure that movement is reflected and that rules for updating the table and modifying the status are followed.

System Topology Table

Referring to FIG. 4, the System Topology Table (T-Table) has four columns: Nodes, 4.3, (source address of the transmitted packet), Status 4.1, (B for boundary and I for Internal), Dependency 4.4, {d0,d1, . . . , dn} destination addresses which are associated with a node, and watermark, or Count (C(.)), 4.2. Dependency is defined as a set of elements, which contain the address of hidden nodes. Count is a watermark counter which is updated on each table access. The count is reset to zero on each update to a specific node. Additionally all other watermarks for entries in the table are incremented by one. When the watermark reaches a predefined number, that entry (s) is removed from the table.

Table Entry and Update Algorithm

Figure 5:
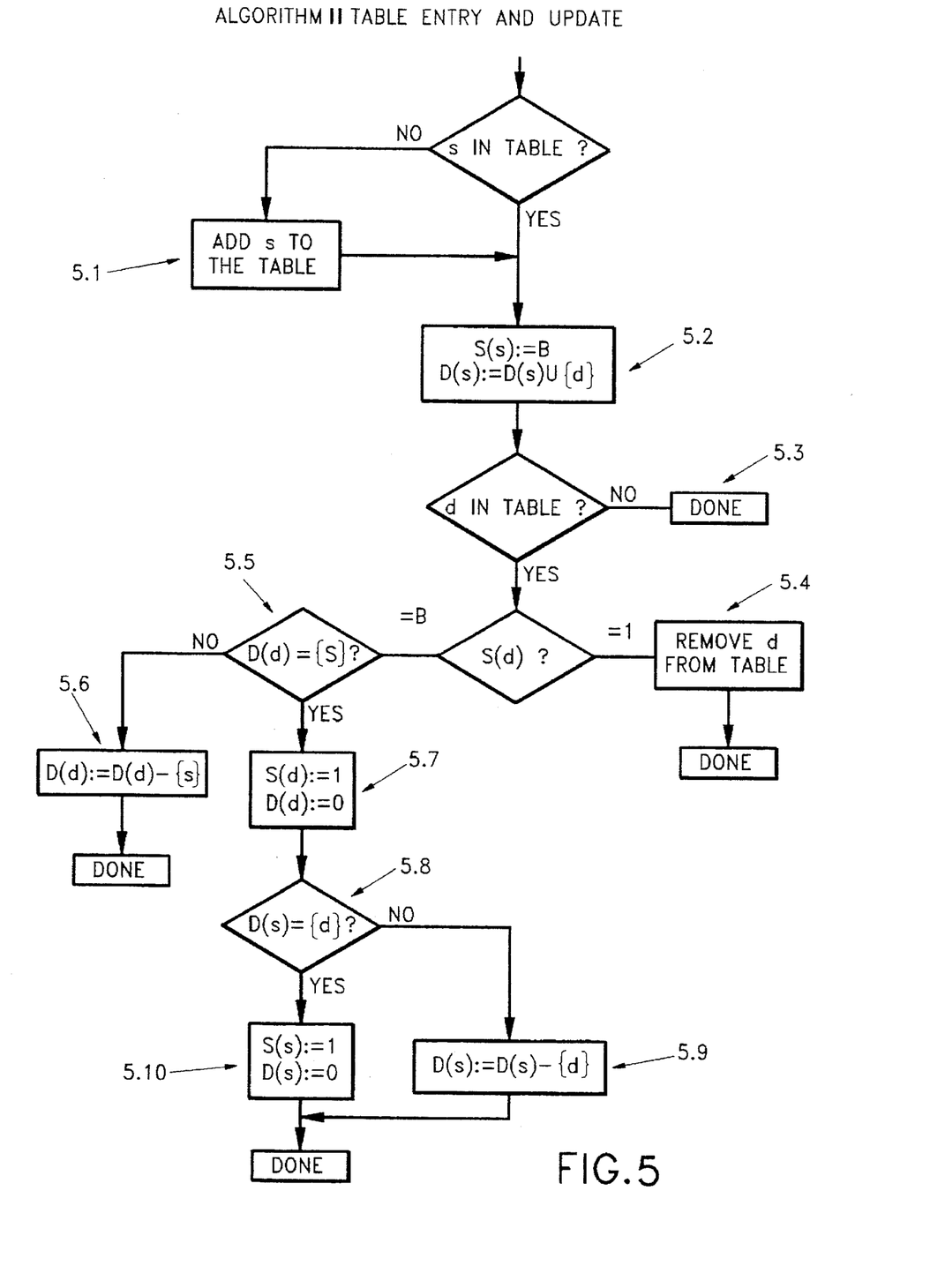
FIG. 5 illustrates the process flow for table entry and updating in accordance with one embodiment of the present invention.

Refer to FIG. 5. Each node monitors all packets transmitted (except for broadcast packets). For each packet it extracts the source, s, and the destination, d, of the packet. The source node, s, is inserted in the table, 5.1, (if it is not already there). The status entry of s is set to B, S(s)=B, (5.2). The destination, d, is added to the dependency list for s (5.2), D(s)=D(s) U {d}, (5.2). This signifies s to be a boundary node (B), and d is added to its dependency list.

If the destination d is not in the table, there is nothing more left to be done (5.3). The algorithm does not try to track hidden nodes. In fact, hidden nodes are purged from the table as soon as they are detected.

If status of d is Internal (S(d)=I), then the d is purged from the table (5.4). The rationale is that if the packet is an ACK or a CTS packet, then d has most possibly moved out of sight and is purged. If the packet is a data packet or an RTS, then when the ACK or CTS is generated (which is done at the MAC level and is very fast), it is put back in the table as an I.

If (S(d)=B), then the dependency list of d is tested (5.5). If D(d) has more than one element, then s is removed from this list (see 5.6) (if s is not in the list, then there is nothing else to be done). On the other hand, if D(d) has only one element which is s (i.e. D(d)={s}), then the status of d is changed to I and its dependency list is set to NULL (see 5.7). After that the dependency list of s, the source node, is tested (see 5.8). If D(s) has more than 1 element, then {d} is removed from D(s) (see 5.9). If D(s) has only one element which is d, then status of s is changed to I and its dependency list is set to NULL (see 5.10).

Figure 6:
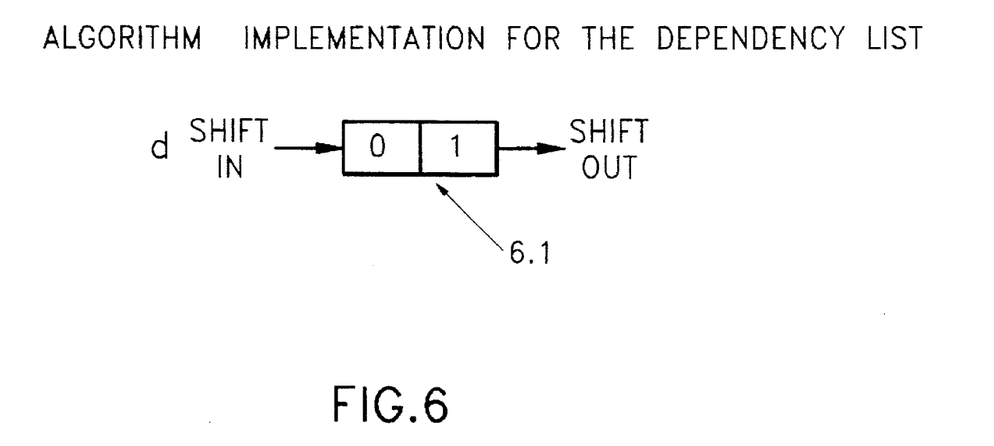
FIG. 6 illustrates a dependency list for a table entry.

These operations are shown in the FIG. 6 flow diagram.

Implementation for the Dependency list

Refer to FIG. 6. In theory, the dependency list for a table entry, s, can become very large. In fact, it contains the hidden nodes for which s is the gateway. In practice, the number of entries in D(s) can be limited to 2, and it can be implemented by a shift register (6.1). The entries in the shift register are 0, and 1, with 1 being the oldest element as shown above. The function of this shift register is similar to a FIFO queue. In addition, there is no duplicate entry for the same node in this queue. Hence, the differences between this implementation and a typical shift register are:

1. No duplicate entry
2. Entries can be added and removed at random.

Upon entry of new elements d into the table the register shifts to the right adjusting the content, adding d→(0) [(i) means the content of register element i]. Additionally, the elements in the FIFO can be removed by shifting out or resetting the element based on the location of the elements and the operation performed on the register. There are no duplicate entries in this set. Therefore, each update will check (0) and if d=(0), then the entry is ignored. If d=(1) then (d) is shifted into the register. Additionally, in the removal process if element 0 was to be removed then element 1 will shift into 0. If element 1 was the target then there is no change to element 0. What has been illustrated are the minimum requirements. The shift register or FIFO can be expanded to the nth elements, creating a linear sparse matrix. The same basic rules apply to the entry, shifting, and removal of the elements.

Cleaning up of the Topology Table

Figure 7:
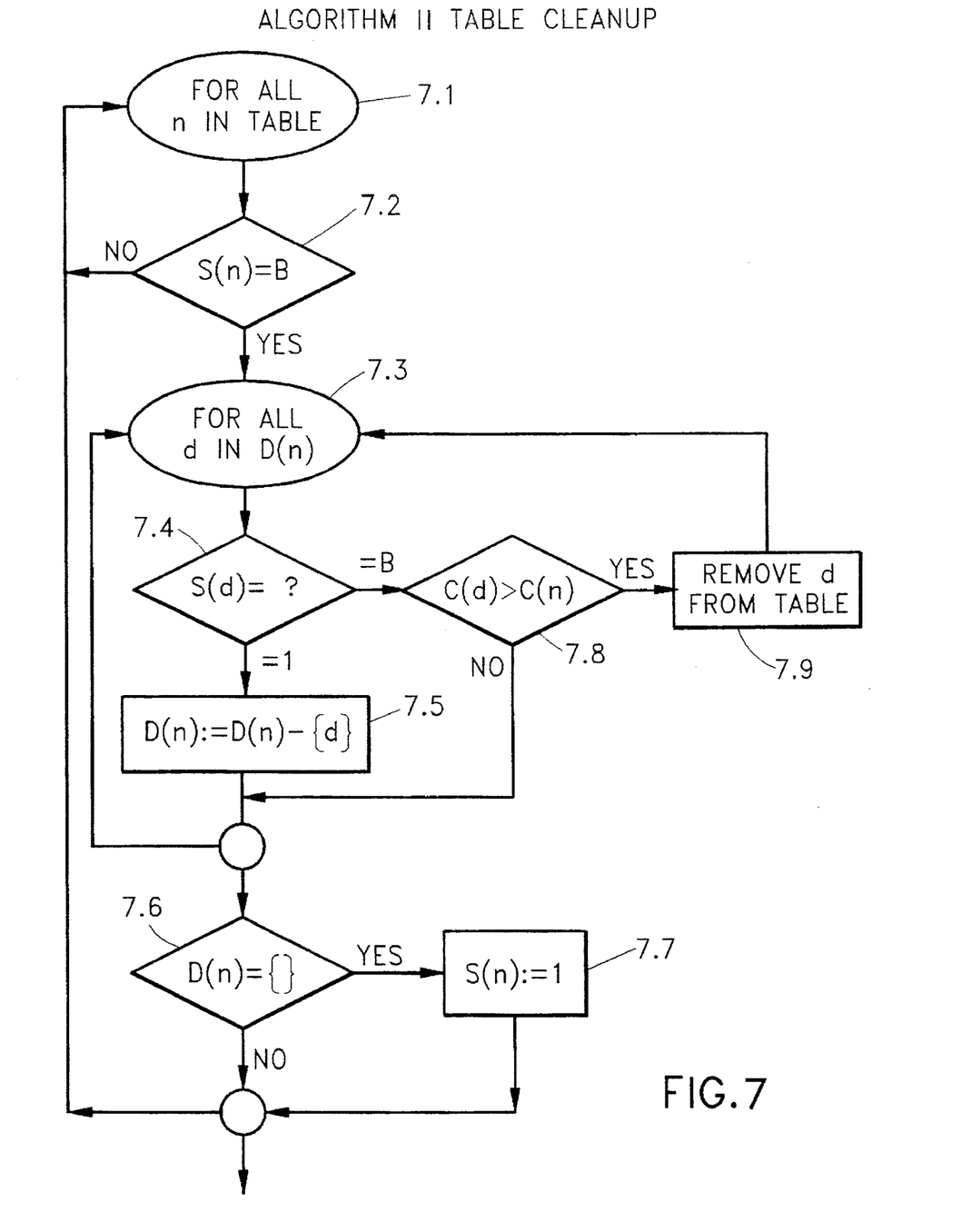
FIG. 7 provides an illustration of the process flow for cleaning or clearing a table.

Refer to FIG. 7. detection of an ACK frame initiates a table cleanup as follows. For every node, n, in the table (see 7.1) which is a boundary node, i.e. S(n)=B (see 7.2), the elements of it dependency list (d in D(n)), are checked. See 7.3. If S(d)=I (7.4), then d is removed from the dependecny list of n (see 7.5). If d is a boundary node (see 7.4), then the water count of d is compared with the water count of n (see 7.8). If d is an older entry, then this might indicate that d has moved out of the network, in which case d is removed from the table (see 7.9).

Algorithm III: Distributed and Node-Based Algorithm for Detection of Hidden Nodes In this section, we describe Algorithm III where every node of the network detects the presence of hidden nodes. In this algorithm, each node of the network makes a decision regarding the use of CSMA or CSMA with RTS/CTS (R-CSMA) independently from other nodes. This is done by observing the frames transmitted in the network in a promiscuous way. This algorithm is basically the same as Algorithm I: Distributed Algorithm for Detection of Hidden Nodes, with the following differences:

The R-CSMA or CSMA is done in a per-node manner. That is, any packet transmission is done in the CSMA mode if there is no hidden node from the node which is communicating to the destination of the packet transmission. If hidden nodes are present, then R-CSMA is used.

Instead of a one dimensional status table, a two dimensional table is used.

Figure 8:
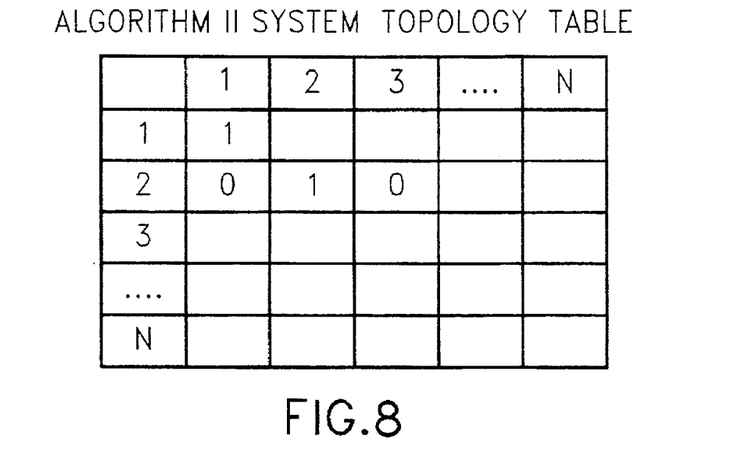
FIG. 8 illustrates a system topology table in accordance with one implementation of the invention.
Figure 11:
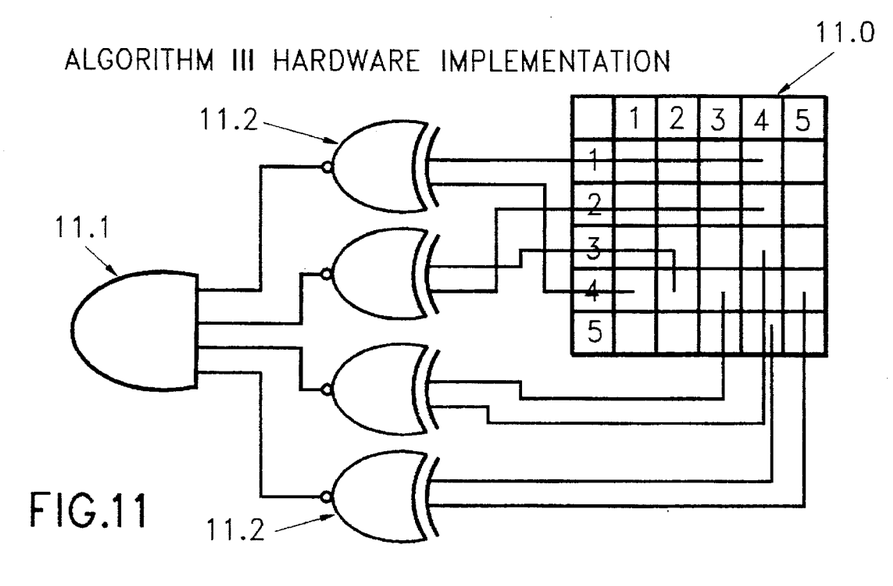
FIG. 11 illustrates a representative hardware implementation for one embodiment of the present invention.

The status table is a two dimensional table in which there is one row and one column associated with each node in the network and where each entry is a single bit (see FIG. 8). After a node is discovered, a row and column is added to the table corresponding to that node. Let us assume that we are looking at the table of node n. The table entry [i,j]=1 means that the frame transmissions of node i to j can be heard by n, and similarly, table entry [i,j]=0 means that the frame transmissions of node i to j cannot be heard by n. So, to make a decision as to send frames to a node i in CSMA or R-CSMA, we need to look at all entries of the row i and column i. If there is an entry where [i,k]=1 and [k,i]=0, then k is hidden from node n. However, if for all values of k, we have [i,k]=1, and [k,i]=1, then i does not communicate with any node which is hidden from n. So, to communicate to node i, all [i,k] and [k,i] entries of the table are Exclusive-NORed, and finally, the results are ANDed to get the final mode selection bit (1 for CSMA and 0 for R-CSMA with node i). In FIG. 11, the Exclusive-NOR circuits 11.2, operating on the corresponding entries in table 11.1, and the outputs of the circuits 11.2 are applied to AND gate 11.1. The output of the AND gate then determines the access mode to be used.

In the following we describe the algorithm where (S, D) represents a frame with source S and destination D. [S, D] refers to the location [S,D] of the status table containing a single bit.

Detection of a Data Frame

Figure 9:
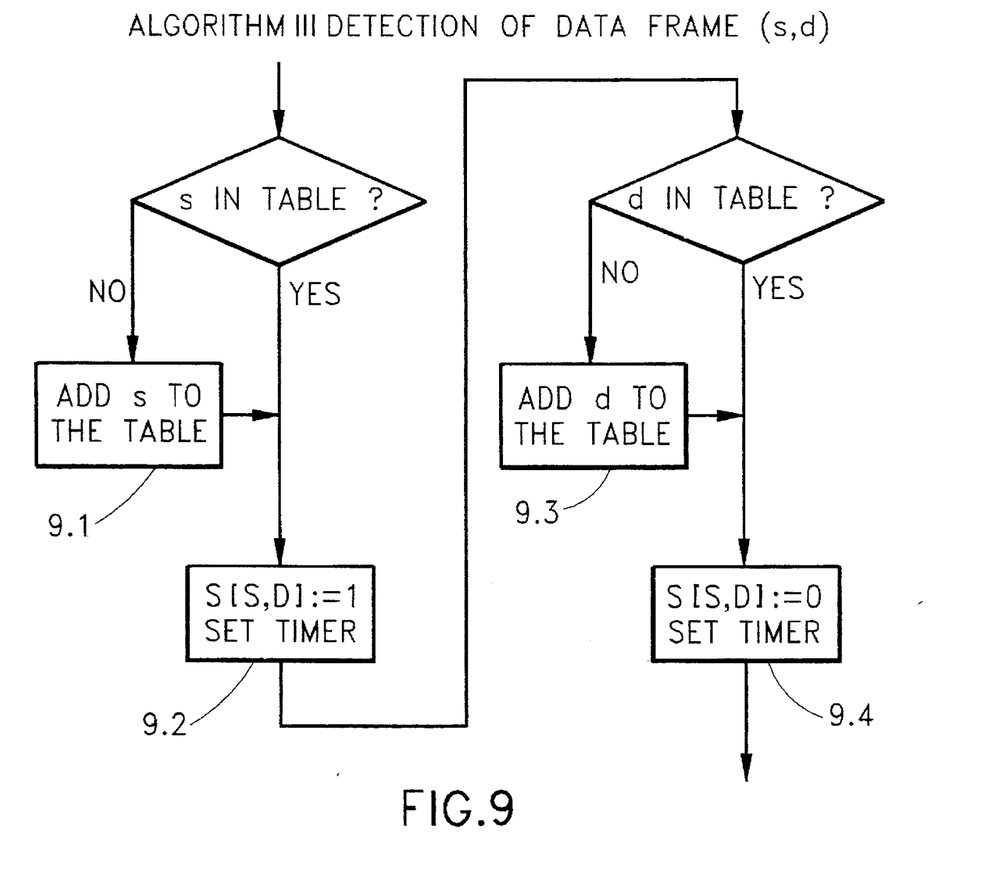
FIG. 9 illustrates the process flow for data frame detection in accordance with one implementation of the present invention.

Refer to FIG. 9. After detection of a data frame, the source address (S) of the frame is added to the table (see 9.1). In any case, the status of [S,D] is marked as 1 (1 means that the network node is in range of the node n and 0 means potentially out of range). See 9.2. Regarding the destination address (D) of the frame, it is added to the table if it does not exist and if it is not a broadcast (or group) address, see 9.3. In any case, the table entry [D,S] is set to 0. See 9.2

Detection of an ACK frame

Figure 10:
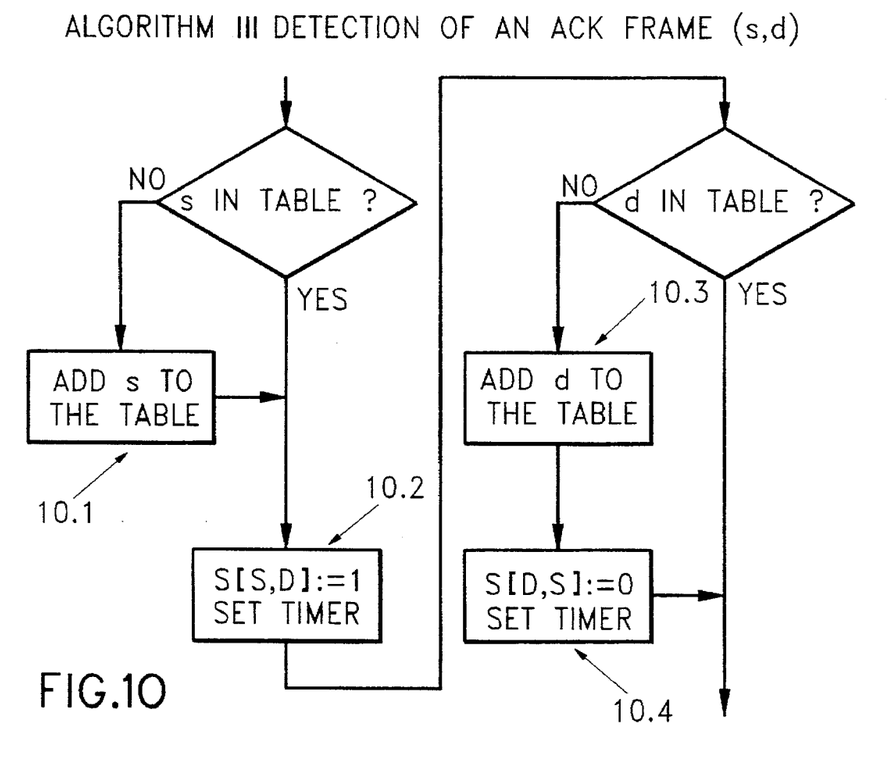
FIG. 10 provides the process flow for acknowledgement frame detection in accordance with one implementation of the present invention.

Refer to FIG. 10. After detecting an ACK frame, if the source address of the frame is not in the table, it is added, see 10.1. In any case, the status of [S,D] added is set to 1, see 10.2. In addition, if the destination address of the ACK frame is not in the table, it is added and [D,S] is marked as 0, see 10.3 and 10.4.

Algorithm Implementation

As an example, we have shown the status table for a 5 nodes (1, 2, 3, 4, 5) at node 6. The logic diagram for the R-CSMA/CSMA with respect to node 4 is drawn in FIG. 11. If the output of the AND gate 11.1 is 1 then CSMA is used otherwise R-CSMA. Also, the table (11.0) is initialized to 0 at the beginning or when the table entries are aged out. Similar to the above cases, each table entry is aged out.

REFERENCES

[ABBRAMSON70] Abramson, N. "The ALOHA System-Another Alternative for Computer Communications," Proceedings, Fall Joint Computer Conference, 1970.

[Bharghavan94] V. Bharghavan, A. Demers, S. Shenker, L. Zhang, "MACAW: A Media Access Protocol for Wireless LANs", Sigcom 94, August 94, London, UK.

[TOBAJI80] Tobaji, F. A. "Multiaccess Protocols in Packet Communication Systems," IEEE Transactions on Communications, April 1980

We claim:

1. In a wireless communications network having a plurality of transceiver nodes, a method of accessing said network said method comprising:

a. determining if there are hidden nodes among said nodes in said network; and b. dynamically selecting an access protocol based upon said determining, whereby said network is accessed with one of a first class of access protocols if there are determined to be no hidden nodes among said nodes and said network is accessed with one of a second class of access protocols if it is determined that there are hidden nodes among said nodes.

2. In a wireless communications network having a plurality of transceiver nodes, a method of accessing said network said method comprising:

a. determining if there are hidden nodes among said nodes in said network; and b. dynamically selecting an access protocol based upon said determining, whereby said network is accessed with a carrier sense multiple access protocol if there are determined to be no hidden nodes among said nodes and said network is accessed with a collision avoidance access protocol if it is determined that there are hidden nodes among said nodes.

3. A method as recited in claim 2, wherein each access protocol will be used for at least a minimum time period before being changed to another access protocol.

4. In a communications network having a plurality of nodes, a method of determining the presence or absence of hidden nodes in said network, said method comprising:

a. monitoring each frame transmitted in said network for its source address and destination address, and monitoring each frame transmitted in said network to determine whether it is a data frame or an acknowledgement frame;

b. maintaining a table indicating whether a node of said nodes is hidden; and c. updating said table when receiving each data frame, wherein an entry in said table corresponding to said source address in each data frame is updated to indicate that one of said nodes corresponding to said source address is not hidden, and wherein each entry in said table corresponding to said destination address in each data frame is updated to indicate that one of said nodes corresponding to said destination address is a hidden node; and d. updating said table when receiving each acknowledgement frame, wherein an entry in said table corresponding to said source address in each acknowledgement frame is either added or updated to indicate that one of said nodes corresponding to said source address in each acknowledgement frame is not hidden, and where each entry in said table corresponding to said destination address in each acknowledgement frame is added to indicate that one of said nodes corresponding to said destination address in each acknowledgement frame is a hidden node if said destination address in each acknowledgement frame was not previously in said table.

5. A method as recited in claim 4, wherein each entry in said table will remain in said table for at most a threshold time period.

6. In a communications network having a plurality of nodes, a method of detecting the presence of hidden nodes by each node n of said nodes, said method comprising:

a. monitoring each frame transmitted in said network for its source and destination address;

b. maintaining a table indicating whether a transmission between two nodes that is heard by said node n; and c. updating said table in each node that monitors a frame being transmitted from any node i to any node j, said entry corresponding to the tuplet (i,j) being updated to indicate that a transmission from node i to node j can be heard, wherein an indication in said table that a transmission from node i to node j was heard while there was no transmission heard from node j to node i indicates that there is at least one node that is hidden from node n.

7. A method as recited in claim 6, wherein each entry in said table will remain in said table for at most a threshold time period.

8. In a wireless communications network having a plurality of transceiver nodes, a method of accessing said network said method comprising:

a. monitoring each frame transmitted in said network for its source address and destination address, and monitoring each frame transmitted in said network to determine whether it is a data frame or an acknowledgement frame;

b. maintaining a table indicating whether a node of said nodes is hidden; and     c. updating said table when receiving each data frame, wherein an entry in said table corresponding to said source address in each data frame is updated to indicate that one of said nodes corresponding to said source address is not hidden, and wherein each entry in said table corresponding to said destination address in each data frame is updated to indicate that one of said nodes corresponding to said destination address is a hidden node; and     d. updating said table when receiving each acknowledgment frame, wherein an entry in said table corresponding to said source address in each acknowledgement frame is either added or updated to indicate that one of said nodes corresponding to said source address is not hidden, and where each entry in said table corresponding to said destination address in each acknowledgment frame is added to indicate that one of said nodes corresponding to said destination address in said acknowledgement frame is a hidden node if said destination address in each acknowledgement frame was not previously in said table;

e. accessing said network with a carrier sense multiple access protocol if there are determined to be no hidden nodes among said nodes; and     f. accessing said network with collision avidance access protocol if it is determined that there are hidden nodes.

\* \* \* \* \*